Patented Jan. 2, 1940

2,185,901

UNITED STATES PATENT OFFICE 2,185,901

METALLIFEROUS AZO-DYESTUFFS CONTAINING THE PYRAZOLONE RING

Max Schmid, Riehen, Switzerland, assignor to the firm Society of Chemical Industry in Basle, Basel, Switzerland No Drawing. Application May 18, 1938, Serial No. 208,704. In Switzerland May 22, 1937

4 Claims. (Cl. 260—147)

According to this invention new metalliferous azo-dyestuffs containing the pyrazolone ring which are distinguished by excellent properties of fastness and especially by the high fastness to light of their dyeings on cotton are made by causing a halide of a polyvalent organic acid or an analogue thereof to react with a coupling component which, on the one hand, is capable of being combined with diazo-compounds to form azo-dyestuffs owing to the presence of a 5-pyrazolone ring and, on the other hand, contains an aromatically bound amino-group, and causing the product so obtained to react with a diazo-compound which is substituted in ortho-position to the diazo-group by a group which is capable of forming complex metal compounds in combination with the enolisable CO-group of the pyrazolone, for example a hydroxyl or carboxyl group, or by a substituent capable of being converted into such a group, and converting the dyestuff so obtained into a complex metal compound.

Like dyestuffs are also obtained by causing a diazo-compound of the kind above defined to react in a first stage with a coupling component which, on the one hand, is capable of combining with diazo-compounds to form azo-dyestuffs, owing to the presence of a 5-pyrazolone ring, and, on the other hand, contains an aromatically bound amino-group or a group capable of conversion into such an amino-group, and in a second stage causing to act on the dyestuff so obtained in any desired order of succession an agent yielding metal and a halide of a polyvalent acid or an analogue thereof, if required after conversion into an aromatically bound amino-group of the group capable of conversion into such a group.

The procedure may also be such that the metallization is combined with the production of the azo-dyestuff or that during the metallization the substituent in ortho-position to the diazo-group of the diazotization component which is capable of conversion into a hydroxyl or carboxyl group, for example a methoxy-group, a halogen atom or a carboxylic ester group, is converted into the hydroxyl or carboxyl group. Alternatively, the metallization may occur only during the use of the dyestuff, for example during the dyeing or on the fibre.

The dyestuffs may be metallized by treatment with a salt, oxide or hydroxide of a metal capable of yielding complex compounds with mordant dyestuffs, such as a salt of copper, nickel, cobalt, iron, chromium, manganese or the like.

Among the diazo-components which may be used for making the new azo-dyestuffs there may be mentioned above all 1-aminobenzene-2-carboxylic acid, 1-aminobenzene-4-nitro-2-carboxylic acid, 1-aminobenzene-4-sulfo-2-carboxylic, 1-amino-4-chloro-2-hydroxybenzene, 1-amino-4-nitro-2-hydroxybenzene, 1-amino-2-hydroxybenzene-4-sulfonic acid, 1-amino-2-chlorbenzene-4-sulfonic acid, 1-amino-2-methoxybenzene-4-sulfonic acid, 1-amino-2-hydroxynaphthalene-4-sulfonic acid, 2-amino-1-hydroxynaphthalene-4:8-disulfonic acid; furthermore, 1-amino-2-chloro- or 1-amino-2-methoxybenzene-5-sulfonic acid and so on. Among the coupling components which may be used for making the new dyestuffs there may be mentioned the ureas or thioureas from amino-arylpyrazolones, for example the urea from 1-(4'-amino)-phenyl-5-pyrazolone-3-carboxylic acid and phosgene, or the condensation products from amino-arylpyrazolones and heterocyclic compounds containing replaceable halogen atoms, such as cyanuric chloride, for example the ternary condensation product from 1 mol of cyanuric chloride, 2 mols of 1-(4'-amino)-phenyl-5-pyrazolone-3-carboxylic acid and 1 mol of aniline.

In making the azo-dyestuffs in accordance with the invention by first preparing the simple azo-dyestuffs and converting it into a urea derivative or into an analogous compound, such as a triazine derivative, there are used as coupling components aminophenylpyrazolones or the corresponding nitro-compounds. In the latter case it will be understood that after coupling has taken place the nitro-group must be reduced to the amino-group according to known methods.

The dyestuffs obtainable in accordance with the invention are suitable in particular for dyeing cellulose or regenerated cellulose such as cotton, ramie, linen, cuprammonium artificial silk or viscose artificial silk. They dye these fibres yellow to orange to brown shades which are distinguished by high fastness properties. The new dyestuffs represent therefore the metal compounds of the azo-dyestuffs of the general formula

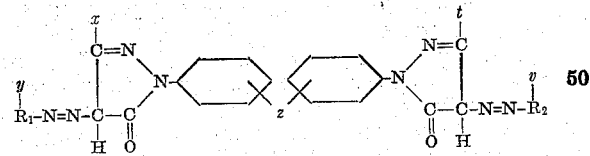

wherein $R_1$ and $R_2$ are aromatic nuclei selected from the group consisting of benzene and naphthalene nuclei, $y$ and $v$ stand for substituents selected from the group consisting of OH and COOH groups and standing in ortho-position to the —N=N— group, $x$ and $t$ stand for members of the group consisting of H, $CH_3$, COOH, $COOC_2H_5$ and phenyl, and $z$ stands for a connecting member of the formula

wherein $a$ stands for a member of the group consisting of the carbonyl group and a triazine nucleus and wherein the

are not linked in 2'-position to the phenyl radicals standing in 1-position to the pyrazolone nuclei, which products are yellow to brown powders dyeing the fiber fast yellow to orange and brown tints.

The following examples illustrate the invention the parts being by weight:

Example 1

23.2 parts of the urea from 1-(4'-amino)-phenyl-3-methyl-5-pyrazolone are dissolved in 3000 parts of water with the addition of 170 parts of anhydrous sodium carbonate and 40 parts of sodium hydroxide. There is then added in the cold a diazo suspension prepared from 21.7 parts of 1-amino-4-sulfobenzene-2-carboxylic acid. After the whole has been stirred for a long time the dyestuff of the formula

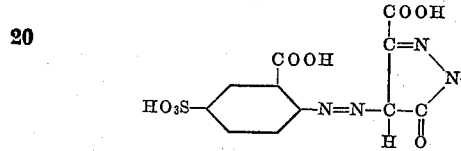

is separated by filtering and introduced into about 500 parts of hot water. A solution from 28 parts of crystallised copper sulfate in about 60 parts of aqueous ammonia of 20 per cent strength is then added and the whole is heated for some time. Common salt is then added and the dyestuff is isolated by filtering. It is a dark powder. This copper compound can advantageously be produced on the fibre if this is first dyed with the hot metallized dyestuff. There are thus obtained yellow shades of good fastness to washing and light. Nickel and cobalt compounds have similar properties.

Similar dyestuffs are obtained if the coupling is conducted in presence of the copper compound or if the isomeric 3'-aminopyrazolone is used as parent material.

Example 2

21.9 parts of 1-(4'-amino)-phenyl-5-pyrazolone-3-carboxylic acid are dissolved in 3000 parts of water with the addition of 170 parts of anhydrous sodium carbonate or 140 parts of sodium hydroxide and 150 parts of crystallized sodium acetate. The solution is cooled with ice and mixed with a diazo solution prepared from 21.7 parts of 1-amino-4-sulfobenzene-2-carboxylic acid. The dyestuff formed is precipitated with the aid of sodium chloride and dissolved in 1000 parts of water together with 200 parts of anhydrous sodium carbonate, and the solution is treated with phosgene until a sample can no longer be diazotized. The dyestuff of the formula

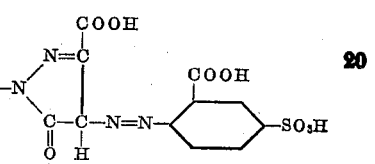

is precipitated by the addition of common salt and is converted in the manner indicated in Example 1 into a copper compound which is similar to that described in Example 1.

The substitution of the 6-nitro-2-aminophenol-4-sulfonic acid for the 1-amino-4-sulfobenzene-2-carboxylic acid leads to a dyestuff whose copper, nickel and cobalt compounds dye cotton brown tints.

Example 3

55 parts of the secondary condensation product from 1 mol of cyanuric chloride and 2 mols of 1-(3'-amino)-phenyl-5-pyrazolone-3-carboxylic acid are introduced into a mixture of 200 parts of water and 50 parts of anhydrous sodium carbonate. After addition of some ice the whole is mixed with a diazo suspension prepared in the usual manner from 43.4 parts of 1-amino-4-sulfobenzene-2-carboxylic acid. The whole is stirred for some time and the dyestuff formed of the formula

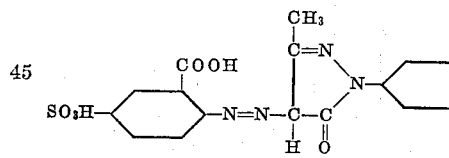

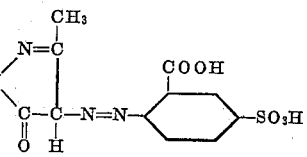

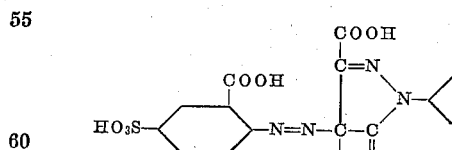

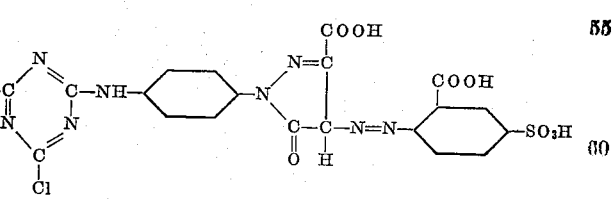

is isolated by addition of common salt and filtered. It is converted in the manner indicated in Example 1 into its copper compound, which dyes cotton or viscose artificial silk yellow shades fast to light. The isomeric dyestuff from the (4'-amino)-phenyl-pyrazolone produces similar dyeings on cotton. The dyestuffs from such condensation products in which the last chlorine atom of the cyanuric chloride is replaced by ammonia, monomethylamine, aniline, ortho-toluidine, 1-aminobenzene-4-sulfonic acid, β-naphthylamine and the like behave analogously. If the condensation product contains a sufficient number of groups lending solubility, the 1-amino-4-sulfobenzene-2-carboxylic acid can also be replaced by the 1-aminobenzene-2-carboxylic acid. The following are formulas of such dyestuffs carboxylic acid and converting the resulting dyestuffs into its copper compound, if necessary after reaction of the last chlorine atom with an amino-compound named in the preceding paragraph.

If instead of sulfoanthranilic acid or the an-

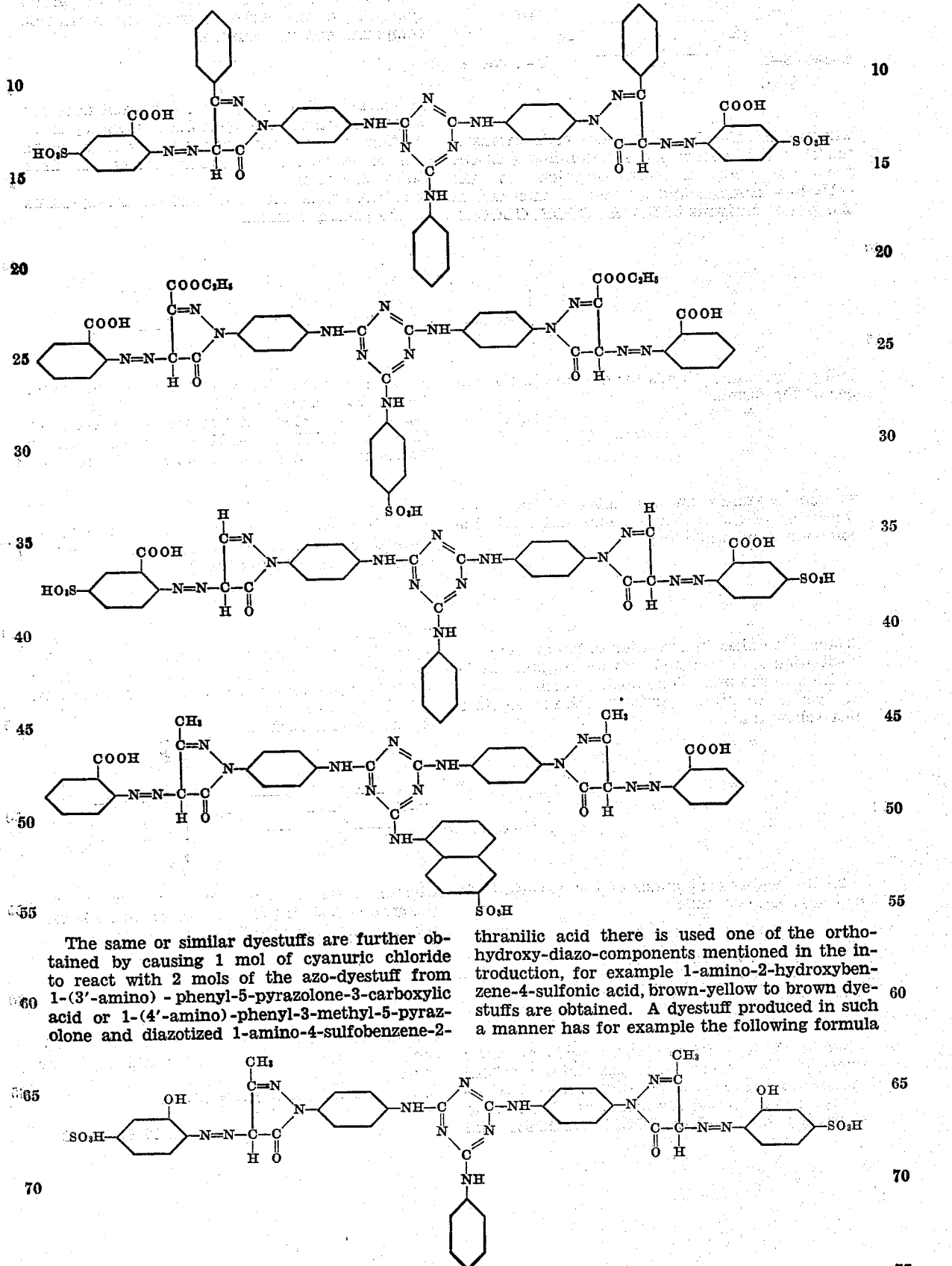

The same or similar dyestuffs are further obtained by causing 1 mol of cyanuric chloride to react with 2 mols of the azo-dyestuff from 1-(3'-amino)-phenyl-5-pyrazolone-3-carboxylic acid or 1-(4'-amino)-phenyl-3-methyl-5-pyrazolone and diazotized 1-amino-4-sulfobenzene-2- thranilic acid there is used one of the ortho-hydroxy-diazo-components mentioned in the introduction, for example 1-amino-2-hydroxybenzene-4-sulfonic acid, brown-yellow to brown dyestuffs are obtained. A dyestuff produced in such a manner has for example the following formula

What I claim is:

1. The metal compounds of the azo-dyestuffs of the general formula

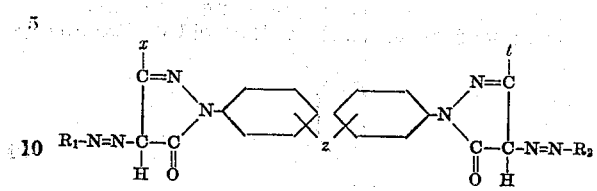

wherein $R_1$ and $R_2$ are mono-cyclic aromatic nuclei of the benzene series containing a COOH group standing in ortho-position to the —N=N— group, $x$ and $t$ stand for members of the group consisting of H, $CH_3$, COOH, $COOC_2H_5$ and phenyl, and $z$ stands for a connecting member of the formula

wherein $a$ stands for a member of the group consisting of the carbonyl group and a triazine compound and wherein the

groups are linked in a position different from the 2'-position to the phenyl radicals standing in 1-position to the pyrazolone nuclei, which products are yellow to brown powders dyeing the fiber fast yellow tints.

2. The copper compounds of the azo-dyestuffs of the general formula

wherein $R_1$ and $R_2$ are mono-cyclic aromatic nuclei of the benzene series containing a COOH group standing in ortho-position to the —N=N— group, $x$ and $t$ stand for members of the group consisting of H, $CH_3$, COOH, $COOC_2H_5$ and phenyl, and $z$ stands for a connecting member of the formula

wherein $a$ stands for a member of the group consisting of the carbonyl group and a triazine compound and wherein the

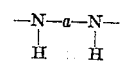

groups are linked in a position different from the 2'-position to the phenyl radicals standing in 1-position to the pyrazolone nuclei, which products are yellow to brown powders dyeing the fiber fast yellow tints.

3. The copper compounds of the azo-dyestuffs of the general formula

wherein $y$ stands for a member selected from the group consisting of H and $SO_3H$, $x$ and $t$ stand for members of the group consisting of H, $CH_3$, COOH, $COOC_2H_5$ and phenyl, and $z$ stands for a connecting member of the formula

wherein $a$ stands for a member of the group consisting of the carbonyl group and a triazine compound and wherein the

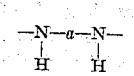

groups are linked in a position different from the 2'-position to the phenyl radicals standing in 1-position to the pyrazolone nuclei, which products are yellow powders dyeing the fiber yellow tints.

4. The copper compounds of the azo-dyestuffs of the general formula

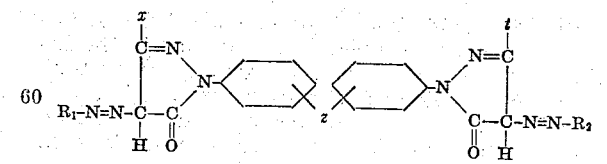

wherein $y$ stands for a member selected from the group consisting of H and $SO_3H$ and $z$ stands for a connecting member of the formula

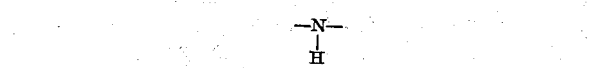

wherein $a$ stands for a member of the group consisting of the carbonyl group and a triazine compound, which products are yellow powders dyeing the fiber fast yellow tints.

MAX SCHMID.